July 4, 1961
R. D. PITTS ET AL
2,990,573
POULTRY SHACKLE
Filed Sept. 29, 1958
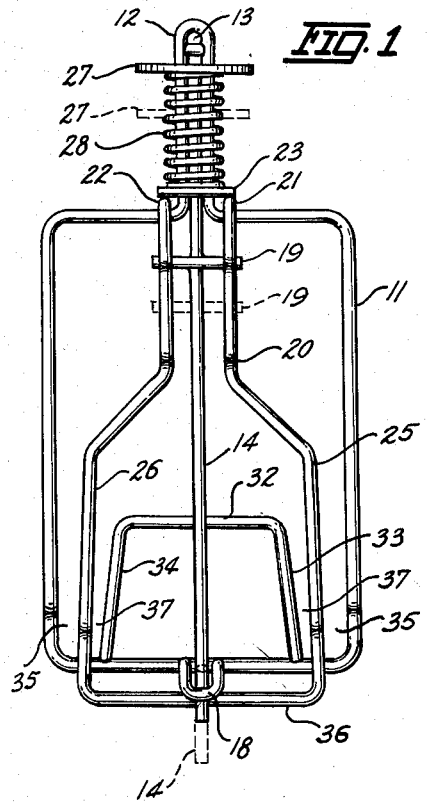
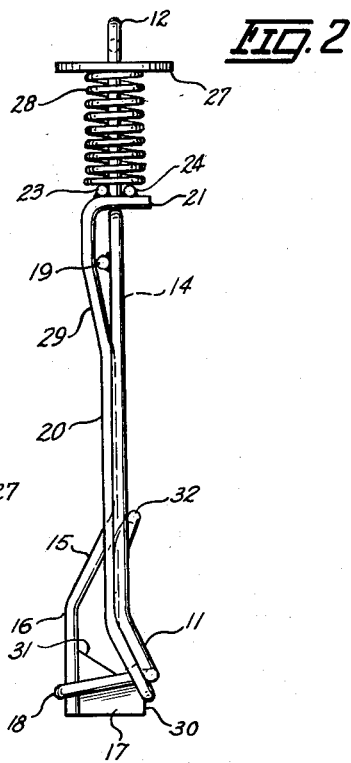
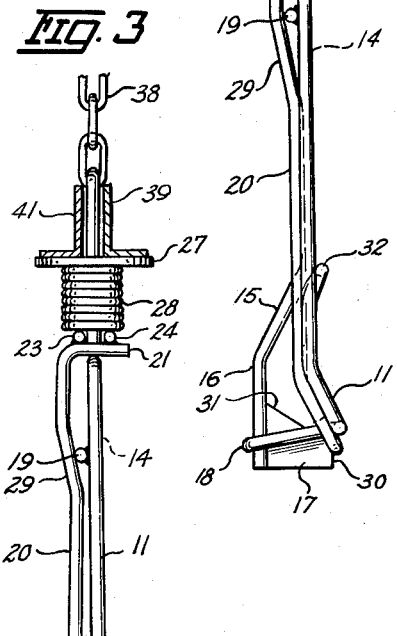
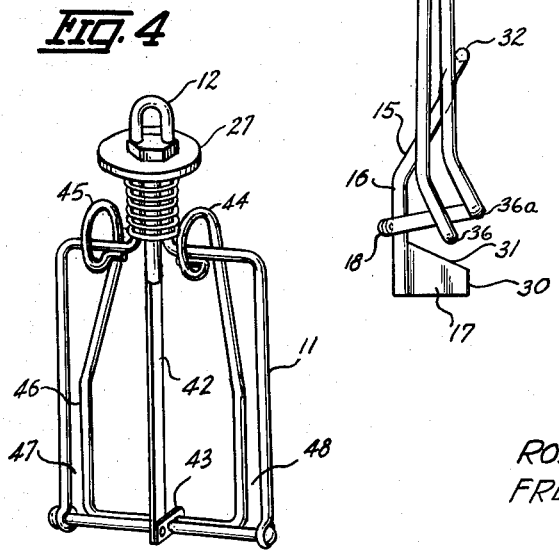
INVENTORS.
ROBERT DONALD PITTS
FREDERICK C. COREY
BY *Corey & Corey*
ATTORNEYS 
United States Patent Office 2,990,573
Patented July 4, 1961

2,990,573
POULTRY SHACKLE
Robert Donald Pitts, 1125 Ellis Boulevard, NW., and Frederick C. Corey, 2235 Upland Drive, SW., both of Cedar Rapids, Iowa
Filed Sept. 29, 1958, Ser. No. 764,155
4 Claims. (Cl. 17—44.1)

This invention relates to a poultry holding shackle and more particularly one which may be automatically opened by a trip mechanism.

The common practice in commercial poultry dressing is to employ a powered conveyor to carry the birds from one dressing stage to another. These birds are held by shackles which grip the bird by the feet, using some form of wedge structure for that purpose. When all of the dressing operations are completed, the bird is customarily manually removed from these shackles. It is usually necessary to lift the bird upwardly and out of the shackle.

It will be at once apparent that it would be much more desirable and efficient if a bird could be automatically dropped out of the shackle at a predetermined point when all of the processing operations are completed.

Shackles for this purpose have been proposed, but they frequently employ some form of ejecting lever to force the legs of the bird out of the shackle.

It is a primary object of our invention to provide a device in which the weight of the bird may be utilized to remove it from the shackle.

It is a further object of our invention to provide a device in which the jaws may be forced open by a downward pressure on the operating mechanism of the shackle.

It is a further object of our invention to provide a device in which the bird holding means of the shackle are such that the shackle will accommodate various sizes of fowl, ranging from small broiler chickens to heavy tom turkeys.

Other and further features and objects of the invention will be more apparent to those skilled in the art upon a consideration of the accompanying drawings and following specifications, wherein are disclosed several exemplary embodiments of the invention, with the understanding, however, that such changes may be made therein as fall within the scope of the appended claims, without departing from the spirit of the invention.

In said drawings:

FIGURE 1 is a front view of a shackle constructed according to one embodiment of our invention.

FIGURE 2 is a side view of the device shown in FIGURE 1.

FIGURE 3 is another side view of the device showing the shackle in an open position, and FIGURE 4 is a view in perspective of yet another embodiment of our shackle.

Referring now to the drawings, and more particularly to FIGURE 1; a shackle constructed according to one embodiment of our invention comprises a main frame 11 which is rectangular in shape and formed with a loop 12 extending vertically upward from one end of the rectangle. This loop serves as a shank from which the shackle is hung through means of an eye portion 13 at the upper end of the shank.

Positioned within this loop 12 is a slidable vertical push rod 14 which extends downwardly for the full length of the shackle and close to its lower extremity is bent outwardly at 15 away from the plane of the main frame, thence continued downwardly at 16 parallel to the plane of the main frame.

On the lower end of this push rod is an angular key member 17. This push rod and key are positioned in relation to the main frame by a loop member 18 which extends outwardly from the lower portion of the main frame and encloses the push rod and key in such a manner as to prevent its sideward movement.

Also on this push rod member 14, adjacent the upper end thereof, is a cross bar 19 whose function will hereinafter be described.

A second A frame 20 is also positioned on the main frame. This A frame has a pair of inwardly extending rod portions 21 and 22 to which are welded two cross bars 23 and 24. These cross bars are positioned on both sides of the lower portion of the shank member 12. The A frame extends downwardly in a loop formation coextensive in length with the frame member 11. The lower legs 25 and 26 are angled outwardly towards the side members of the main frame to create an angular wedge-shaped area between the A frame and the main frame. It is this area which serves to hold the legs of the fowl. It is preferable that this area be of substantial size in order to accommodate the heavy bone structure of the larger birds such as tom turkeys.

The push rod 14 is adapted for vertical movement within the shank member 12 and along the length of the main frame and the A frame, the upper portion of the rod being attached to a circular plate 27. Between the plate 27 and the cross bar members 23 and 24 is a coil spring 28 which normally urges the plate 27 and the push rod 14 in an upwardly direction.

Referring now again to the form of the A frame, it will be noted that immediately below the ears 21 and 22 is an angular portion 29 which extends inwardly towards the main frame. Adjacent the upper end of this angular portion is the previously described cross bar 19 of the push rod. It will be apparent that as the plate 27, push rod 14, and cross bar 19 are forced downwardly, this bar will bias against the angular portion 29 of the A frame and cause it to be pivoted outwardly away from the main frame. It will also be noted that the key portion 17 will likewise be moved downwardly.

The key portion 17 is so positioned that when the push rod 14 is in its uppermost extremity, the forward face 30 of the key is against the lowermost portion of the A frame 20. As this push rod 14 and key 17 are moved downwardly, the face 30 clears the horizontal portion 36 of the A frame 20, thus permitting it to pivot outwardly away from the main frame.

This key 17 also has an upper angular face 31, the angle of this face being such that as the rod moves upwardly, the bar 36 of the A frame tends to be forced inwardly against the main frame.

To provide a smaller wedge section adapted to hold small fowl, such as broilers and fryers, we have provided a second U-frame 32. This frame has two downwardly and outwardly extending legs 33 and 34, the angle of these legs being greater than the angle of the A frame legs 25 and 26, to again provide a triangular area 37 which may serve as a wedge for the fowl.

It will be apparent that when the shackle is closed, as shown in FIGURE 2, the space 35 between the legs 25 and the main frame 11 and also between the legs 25 and the legs 33, is at its smallest distance. This distance is selected to correspond to the average diameter of the leg structure of the fowl. As the shackle is opened, as shown in FIGURE 3, this space increases to an extent great enough to permit the leg and foot of the fowl to slip downwardly through the opened area. Note that the action is somewhat like that of the pages of a book, with the position of the leaves determining the space between the wedging bars 36 and 36a.

As has been previously stated, it is customary to suspend poultry in shackles from a moving conveyor, a chain being used such as shown at 38 of FIGURE 3 to carry the shackle. At a selected point along the length of the conveyor, a fixed trip mechanism, such as angle iron runners 39 and 41, is provided. These runners 39 and 41 are so positioned as to bear against the plate 27 as it moves on the conveyor, the relationship of the chain length and the position of the runners being such that they cause the plate to be compressed against the spring 28 with a resulting movement of the plunger 14 as has been previously described.

FIGURE 4 is a showing of a slightly different embodiment of our invention in which a plunger rod 42 actuates a latch mechanism 43 which is pivotally mounted on the main frame 11. In this instance the A frame 46 is fixed to the main frame by a pair of spring loops 44 and 45 which normally urge the A frame inwardly against the main frame 11. In this embodiment, the plunger serves to pivot the latch 43 out of engagement with the A frame 46 and the weight of the bird causes the leg portion to slip through the enlarged openings, the openings being indicated generally at 47 and 48. It will be apparent that this embodiment also employs the weight of the bird to cause it to be disengaged from the shackle and also that the triggered enlargement of the opening permits this engagement.

This FIGURE 4 is representative of a shackle suitable for either chickens or turkeys—that is, a device which is better adapted for use with chickens only or turkeys only rather than a combination shackle suitable for both large and small birds, such as illustrated in FIGURES 1 to 3. In the device such as shown in FIGURE 1, turkeys would have their legs inserted between bars 25 and 11, and chickens between bars 33 and 25.

If the device shown in FIGURES 1 to 3 are to be used only for chickens, the loop 32—34 would be unnecessary. If the device is to be used with extremely large birds, it may be necessary to position the side bars 11 farther apart and broaden the members 25 and so make the cam 30 and loop 18 larger to permit a wider opening. The member 25 may be flattened or made wider by adding another bar parallel to bar 25.

Although we have described several embodiments of our invention, it is apparent that modifications thereof may be made by those skilled in the art. Such modifications may be made without departing from the spirit and scope of our invention as set forth in the appended claims.

We claim as our invention:

1. In an automatic poultry shackle, a vertically extending rectangular main frame having an upper shank portion formed thereon, a second frame vertically positioned inwardly of said first frame and normally urged in substantially the same plane thereof, said inner frame being joined to said main frame adjacent the shank thereof, said second frame further being of such lesser size as to provide a pair of upwardly extending openings between said first and second frames, a plunger extending downwardly from said shank portion, the lower end thereof having locking means adapted to hold said main frame and said second frame in substantially the same plane, and means positioned on said shank and engaged with said plunger, said means being adapted to move said plunger and said locking means downwardly to disengage said secondary frame, whereby the openings between said main frame and said second frame will be enlarged to permit the feet of poultry to fall downwardly from therebetween.

2. In a device as set forth in claim 1, said second frame having an angular portion formed therein and means on said plunger adapted to engage said angular portion to force said second frame outwardly in relation to said main frame.

3. In an automatic poultry shackle, a vertically positioned rectangular main frame having an upper shank portion formed thereof, a second frame vertically positioned inwardly of said first frame and joined thereto adjacent the upper shank thereof, the opposite end of said frame being positioned inwardly of said first frame to provide a pair of upwardly extending openings therebetween, said second frame having an angular portion extending outwardly from the plane of said first frame, and a plunger extending downwardly from said shank the length of said first and second frame, and downwardly movable means on said shank engaging said plunger bar means on said plunger positioned to engage said angular portion, said downwardly moving means being adapted to move said bar means coextensively of said angular portion to cause said inner frame to be pivoted outwardly from the plane of said main frame, whereby the opening therebetween will be enlarged proportionate to the extent of the said movement to permit the feet of poultry to fall downwardly from therebetween.

4. In a device as set forth in claim 3, an angled locking means on said plunger, said means being positioned adjacent the lowermost portion of said second frame to prevent the outward movement thereof when the plunger is in its uppermost position.

References Cited in the file of this patent
UNITED STATES PATENTS

| | | |
|---|---|---|
| 2,688,765 | Sharp et al. | Sept. 14, 1954 |
| 2,739,347 | Sharp et al. | Mar. 27, 1956 |
| 2,797,436 | Shadley | July 2, 1957 |